Figure 1:
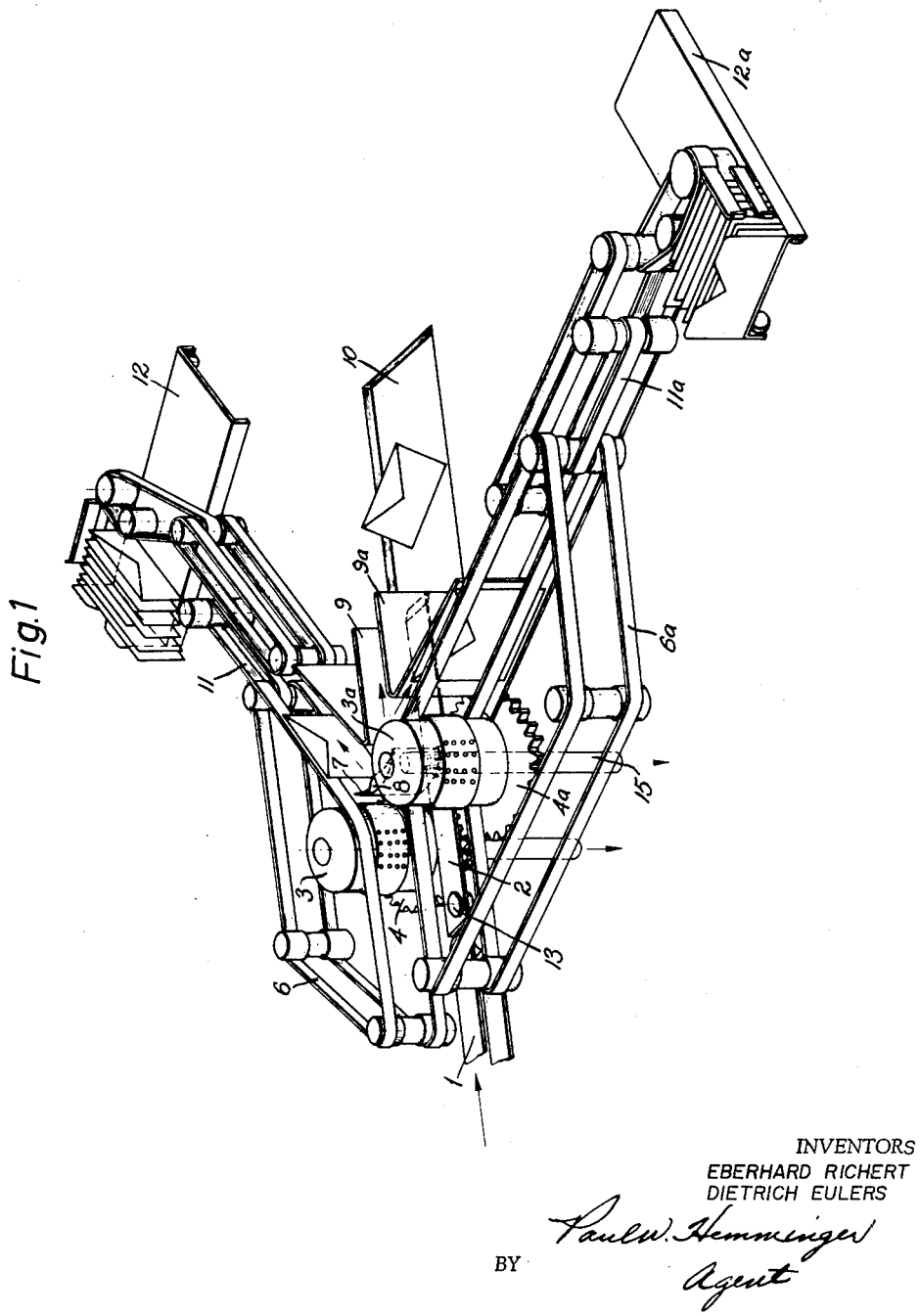

United States Patent Office 3,140,780
Patented July 14, 1964

3,140,780
ARRANGEMENT FOR EDGEWISE CONVEYING SYSTEMS TO SEPARATE AND EQUALLY DISTRIBUTE IRREGULARLY SUPPLIED ARTICLES ON TWO CONVEYING PATHS
Eberhard Richert, Berlin-Steglitz, and Dietrich Eulers, Berlin-Friedenau, Germany, assignors to International Standard Electric Corporation, New York, N.Y., a corporation of Delaware
Filed Mar. 1, 1960, Ser. No. 12,171
Claims priority, application Germany, Mar. 5, 1959
6 Claims. (Cl. 209—74)

In the conveying technique, especially with respect to the mechanization and automation of postal operations, it is often the problem how to properly order the dispatch articles which travel on edge from a sending station in the unordered condition to a receiving station, with the aid of a special equipment, and how to divide the stream of dispatch articles in a way that it can be directed to two receiving stations whenever the capacity of one receiving station is too small to receive all of the dispatch articles. In postoffice operations the dispatch articles are mostly stacked at the receiving stations, awaiting further delivery to processing machines, or the like. It is a condition of the stacking process that prior thereto a sorting or culling is carried out according to size. Thereupon the dispatch articles of a certain size, which are to be stacked, have to be separated and spaced from one another, in order to enable the stacking to be carried out.

The fact of having to divide the conveying path in order that the individual receiving stations, such as stacking storers, are not charged in excess of their capacity, is still accompanied by the desire to obtain further parallel-extending paths in order to carry out the further processing of the articles. In order to make the spacings between the individual articles to be conveyed as large as possible, and to provide in this way a more reliable operation of the stacking storer, the conveying paths are charged alternatingly with dispatch articles.

An equal distribution of the dispatch articles arriving on one channel, into several outgoing conveying paths can be achieved by way of a multi-path dividing device arranged at the end of the channel. This dividing device is capable of being switched-over in accordance with the number of incoming dispatch articles. Such a mode of operation calls for a light-barrier arrangement employing electronic switching means for controlling the actuation of the dividing device in dependency upon the succession of letters, cards, or the like. This method, however, requires that the dispatch articles to be separated are delivered at exactly defined minimum spacings between the individual dispatch articles. These spacings must be so large, that in the case of a given conveying velocity, the reliable switching-over of the dividing device (switch) between the dispatch articles is still ensured. However, this cannot be guaranteed in many cases of practical application. In addition thereto such an arrangement requires a substantial expenditure on switchhing means.

The invention relates to an arrangement for edgewise conveying systems, and in particular to a device which serves to separate and distribute dispatch articles which may be delivered at irregular intervals or in bulks, to two or more branching-conveying paths or receiving stations. The inventive arrangement consists of two suction devices which are arranged directly in front of the beginning of the branching paths opposite each other on both sides of the conveying channel, and which rotate in the conveying direction. These suction devices are alternatingly effective and are so constructed and arranged that a dispatch article is conveyed from the output of the delivering edgewise conveying system to that particular conveying path on whose side the suction device is effective.

Fundamentally, this suction device can be designed at will. For example, there may be suction mouths which are alternatingly connected to the source of suction air via valves which are alternatingly opened and closed. A particularly suitable type of embodiment of the invention comprises suction devices which are arranged on one portion of the surface of rotating drums. These drums, which are likewise arranged on opposite sides of the channel, are in such a way positively coupled to one another that the suction devices point into one and the same direction. In other words the suction device of only one drum is directed towards the conveying path at any one time. After the next rotation of 180 mechanical degrees of both drums, the other drum's suction device will now point toward the conveying path. As a result, as the drums rotate continuously, the two suction devices alternately are applied to the conveying path so that first one suction device is effective and then on the next cycle, the other suction device is effective and then the first one and so on. Furthermore, it is possible to employ rotating, perforated belts, which pass the opening ends of suction channels and are alternatingly rendered effective.

The arrangement, operating with the rotating drums, can still be improved by bearing the drums eccentrically, so that they feed the dispatch articles vertically in relation to the conveying direction.

The dispatch articles can be delivered individually, but also in groups, and may reach the drums in an overlapping fashion. Alternatingly, the dispatch articles are now individually sucked to the drums and brough into their respectively new travelling directions. Also in this arrangement both the separation of the stream of dispatch articles into two paths, and the separation of the individual dispatch articles is performed in the course of one operating cycle. Large-size and rigid-type dispatch articles are not affected by the change in direction in view of their rigidity, and are conveyed straight-forward. In this way they are separated from the conveying paths for the other dispatch articles. Special guiding arrangements arranged behind the cylinders insure that these articles travel on a specially provided path.

Figure 2:
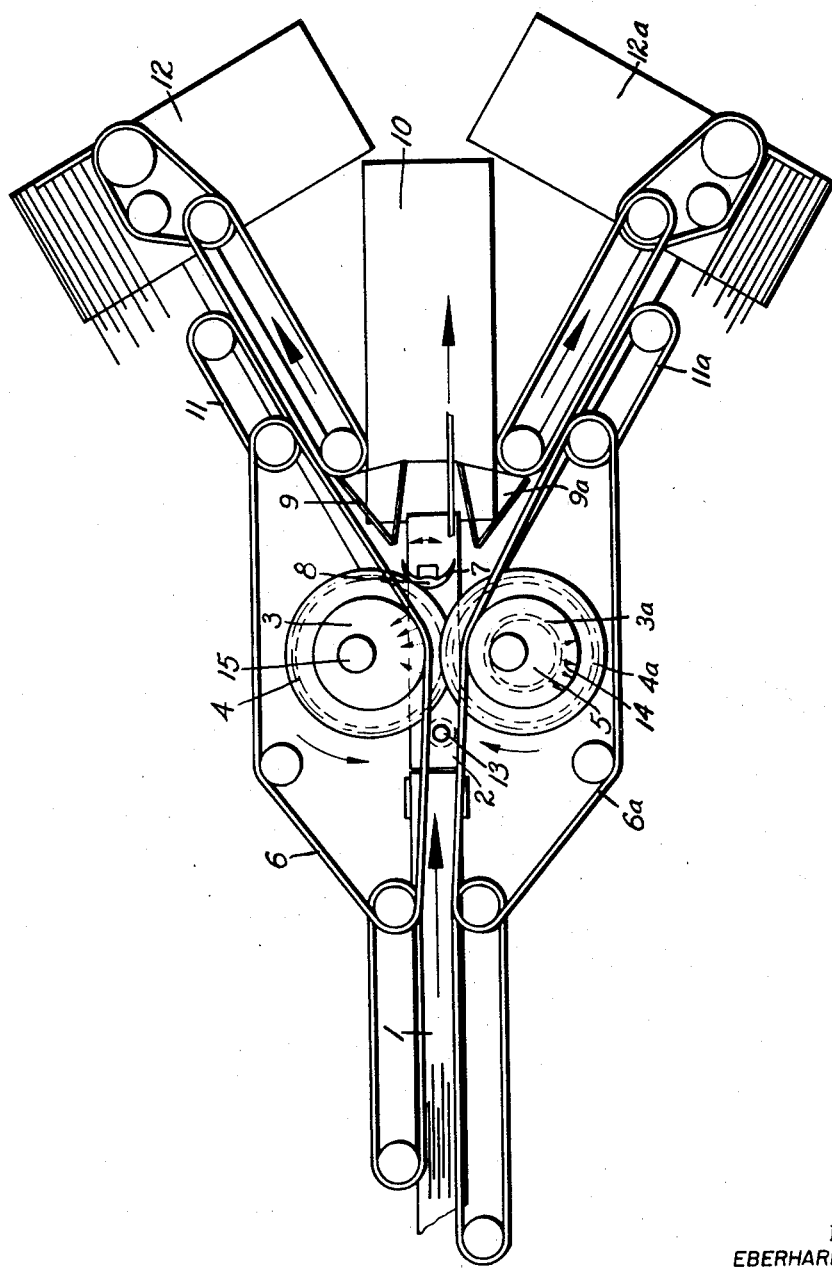
Figure 3:
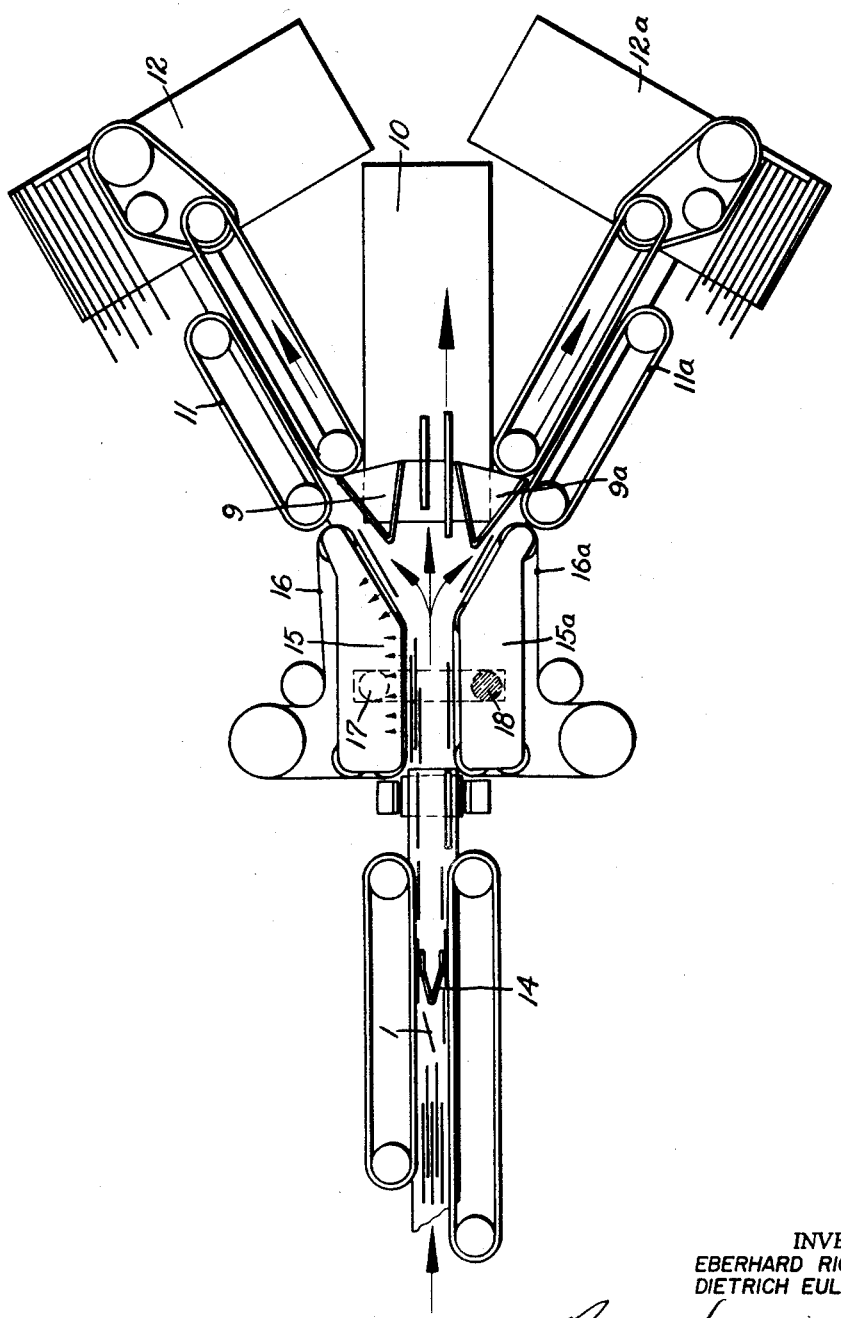

Some exemplified embodiments of the invention are described with reference to FIGS. 1 to 3 of the accompanying drawings, in which:
FIG. 1 shows an arrangement according to the invention with suction devices on drums in a perspective view,
FIG. 2 shows the same arrangement in a top view, and
FIG. 3 shows an arrangement operating with two suction nozzles and pulling-off tapes in a top view.

The arrangement according to FIGS. 1 and 2 operates as follows:

The dispatch articles are conveyed on an edgewise conveying channel and on a base tape 1 to the drums 3, 3a which are arranged symmetrically in relation to the channel. The drums are eccentrically pivoted. Since the eccentricities of both drums are staggered by 180° with respect to one another, the distance between the drums always remains constant. This distance is only translated along the path provided by the eccentric movement of the surface of the two drums. In the upper dead centre of the eccentricity the movement has a retrograde or reversive character. The result is a reciprocal centrifugal effect. On account of this, the dispatch articles are thrown from one side to the other, i.e., always in direction of the drum ready to effect the pulling off. The pressing of the dispatch article against the pulling-off drum is thus amplified by the throwing movement. The bottom of the conveying channels 2, which is reached by the dispatch article after leaving the edgewise conveying path, can be turned round the bearing 13. The bottom 2 of the channel is guided in grooves of the drums and thus follows the eccentric movements of the drums as it is caused to pivot on bearing 13 from one drum to the other. The lateral boundaries are spring-mounted with respect to the drums, in order to avoid severe strokes and noises. This arrangement of the bottom of the conveying channel increases the effect of the throwing movement of the eccentric drums. In the case of a rigid guide plate a greater friction would be produced between the surface of the guide plate and the bottom edge of the dispatch article during the throwing movement; this friction is avoided by employing the turnable bottom 2 of the conveying channel which is pivotally mounted on bearing 13.

The synchronous operation of both drums is ensured by way of two toothed wheels 4, 4a. A dispatch article is respectively pulled off by one drum only, because the sucking rows of holes 14 on the circumference of the drums point into one and the same direction. The driving is effected via a V-belt pulley 5 coupled to the toothed wheels 4 or 4a, by way of an electro-motor. A double conveyor belt 6, 6a with an adhesive coating leads the dispatch articles over the drums. Behind these drums the belts change their directions by about 30°. The dispatch articles which are too heavy and too rigid to follow the belt movement are ejected at this point. The axis of the drum 15 is hollow and is provided with borings in the plane of the drum which are connected to the source of suction air.

All of the dispatch articles approach the spacing between the drums and are then retarded by a limit stop 8. In the case of several dispatch articles lying next to each other, those lying on the outside are alternatively sucked by one of the drums and taken along thereby. In the course of this they approach the elastic portion of the limit stop 7. Flexible dispatch articles are pressed by the drums so far outwardly, that they are taken along by the conveyor belts 6, 6a and brought into the outgoing direction, for example, are led to the stacking device or to the next processing position. This is effected by the pair of belts 11, 11a. Rigid articles, which are not flexible enough to perform the considerable change in direction effected by the drums, or thicker dispatch articles, and such ones which are too heavy, are already separated from the drum prior thereto and pass through the elastic range of the limit stop 7, in order to be fed to the centrally arranged channel 10 dealing with such dispatch articles which are unsuitable to be further conveyed by the system.

Dispatch articles, which are not sufficiently flexible for the above mentioned reasons, to be automatically led to the stacking conveyor belt, are again separated by the deflectors 9, 9a in dependency upon flexibility, and are led either to the stacking track or to the ejecting track. The ejectors may consist e.g. of resiliently suspended rotating bodies or of bodies resembling the shape of a plowshare.

In FIG. 3 a resilient guide sheet 14 is arranged at the output of the edgewise conveying channel 1 adapted to deliver the dispatch articles. This guide sheet 14 presses the dispatch articles against the sides of the channel. At the end of the channel two suction nozzles 15, 15a are arranged opposite each other, round which the perforated pulling-off belts 16, 16a are led. Via two pipe lines 17 and 18 the suction nozzles are alternately connected to a source of suction air, the one of which (17) is shown in the opened, and the other one (18) in the closed condition. The dispatch articles are now fed to the pulling-off belts 16, 16a, and are pulled off in direction of movement of the respective belt. The stream of dispatch articles is thus divided into two paths, and at the same time a minimum spaced relation is established between the individual articles. Too rigid articles are excluded from the further conveyance. The remaining dispatch articles are fed to the stacking storers 12, 12a via the belt guides 11, 11a.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An article conveying system to separate and distribute irregularly delivered articles to two or more branching conveying channels, said system comprising an input conveying channel to supply articles along a predetermined path, a first output conveying channel adapted to receive articles and disposed on one side of said predetermined path, a second output conveying channel adapted to receive articles and disposed on the opposite side of said predetermined path from said first output channel, a first eccentrically mounted rotating drum disposed on one side of said predetermined path adjacent said first output channel, a second eccentrically mounted rotating drum disposed on the opposite side of said predetermined path adjacent said second output channel, a first suction means carried on said first drum, a second suction means carried on said second drum, both said suction devices positioned on the respective portion of the circumference of their respective drum which is farthest from the eccentric center of rotation of said drums whereby said suction devices alternately are effective to seize and feed articles to said output channels in a predetermined ratio.

2. An article conveying system according to claim 1 wherein said first and said second suction means each comprise a foraminous area on the surfaces of said drums.

3. An article distributing system comprising:
   (a) an input conveying channel for conveying desired and undesired articles;
   (b) a first output channel for desired articles;
   (c) a second output channel for desired articles;
   (d) distributing means disposed between said input channel and said output channels;
   (e) a pivotally mounted bottom support member disposed between said input conveying channel and said output channels adjacent said distributing means and in operative relationship with said distributing means whereby said bottom support member is pivoted in directions which aid said distributing means;
   (f) and control means coupled to said distributing means to cause desired articles to be fed in predetermined proportions to each of said first and second output channels.

4. An article distributing system comprising:
   (a) an input conveying channel for conveying desired and undesired articles;
   (b) a first output channel for desired articles;
   (c) a second output channel for desired articles;
   (d) distributing means disposed between said input channel and said output channels;
   (e) a pivotally mounted bottom support member disposed between said input conveying channel and said output channels;
   (f) means for causing said pivotally mounted support member to cooperate with said distributing means to cause said support member to pivot in directions which aid said distributing means;
   (g) and control means coupled to said distributing means to cause desired articles to be fed in predetermined proportions to each of said first and second output channels.

5. An article distributing system comprising:
   (a) an input conveying channel for conveying desired and undesired articles;
   (b) a first output channel for desired articles;
   (c) a second output channel for desired articles;
   (d) a residual output channel for undesired articles;
   (e) distributing means disposed between said input channel and said output channels;
   (f) a pivotally mounted bottom support member disposed between said input conveying channel and said output channels;

(g) means for causing said pivotally mounted support member to cooperate with said distributing means to cause said support member to pivot in directions which aid said distributing means;

(h) and control means coupled to said distributing means to cause desired articles to be fed in predetermined proportions to each of said first and second output channels.

6. An article distributing system comprising an input conveying channel to supply articles along a predetermined path, a first output channel adapted to receive articles, a second output channel adapted to receive articles, a first eccentrically mounted rotating drum and a second eccentrically mounted rotating drum, each disposed on an opposite side of said predetermined path so that the first of said drums is adjacent said first output channel and said second drum is adjacent said second output channel, first suction means disposed on said first drum, second suction means disposed on said second drum, control means connected to both said suction means to alternately apply said suction means to articles disposed along said conveying path whereby articles are fed to said output paths in a predetermined ratio, a bottom support member, means for pivotally mounting said bottom support member along said input conveying channel adjacent said drums so that the sides of said support member are in contacting relationship with the surfaces of both said drums whereby said support member is oscillated between said drums due to the movement of said drums.

References Cited in the file of this patent

UNITED STATES PATENTS

| | | |
|---|---|---|
| 1,940,526 | Berger | Dec. 19, 1933 |
| 2,941,653 | Kriemelmeyer | June 21, 1960 |

FOREIGN PATENTS

| | | |
|---|---|---|
| 425,989 | Great Britain | Mar. 21, 1935 |
| 858,862 | France | May 20, 1940 |
| 1,215,444 | France | Nov. 16, 1959 |